No. 889,070. PATENTED MAY 26, 1908.
H. L. TRUEBLOOD.
COMBINED SAW JOINTER, SET, SWAGE, AND GAGE.
APPLICATION FILED AUG. 10, 1907.
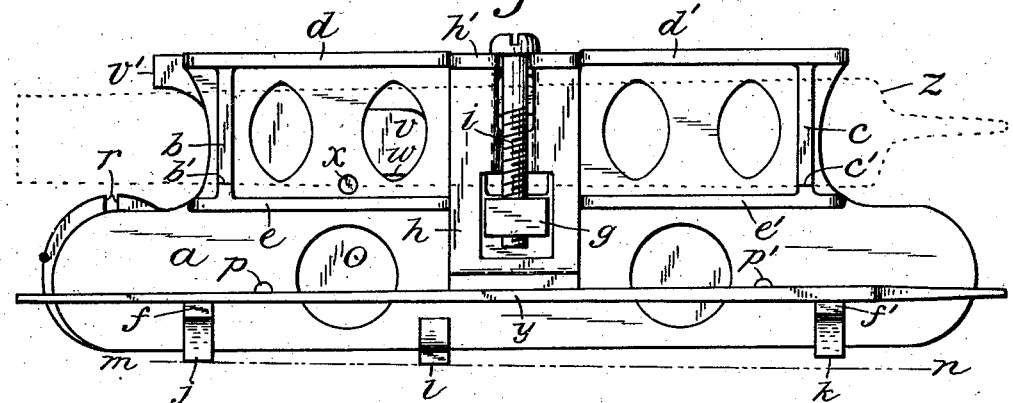
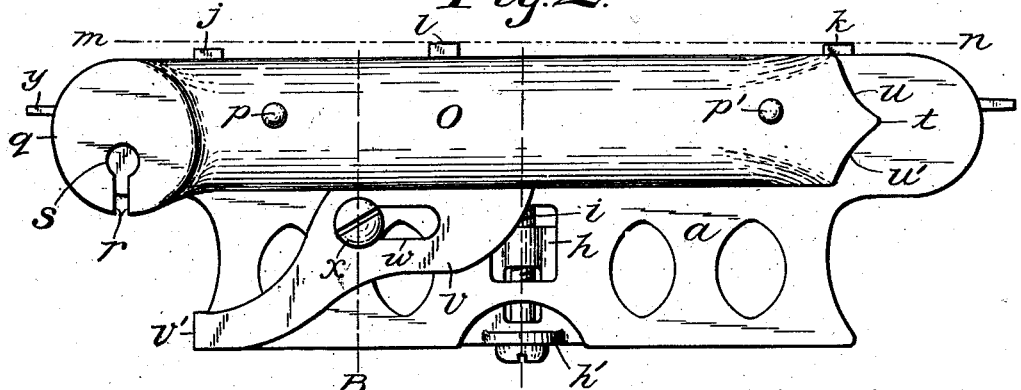
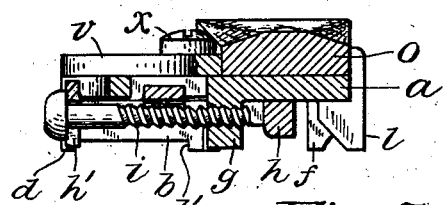
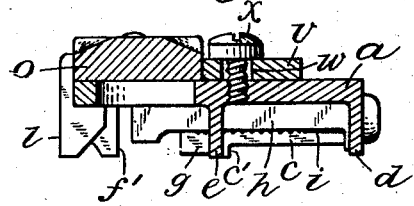
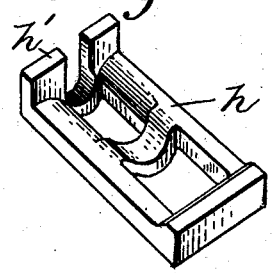
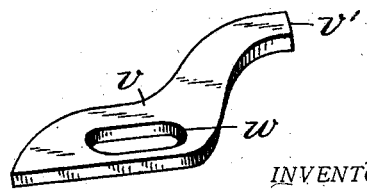
WITNESSES:
J. H. Gardner
M. D. Beaty.
INVENTOR:
Hezekiah L. Trueblood,
BY
E. T. Silvius,
ATTORNEY.

UNITED STATES PATENT OFFICE.

HEZEKIAH L. TRUEBLOOD, OF INDIANAPOLIS, INDIANA.

COMBINED SAW JOINTER, SET, SWAGE, AND GAGE.

No. 889,070.  Specification of Letters Patent.  Patented May 26, 1908.

Application filed August 10, 1907. Serial No. 387,996.

*To all whom it may concern:*

Be it known that I, HEZEKIAH L. TRUE-BLOOD, a citizen of the United States, residing at Indianapolis, in the county of Marion and State of Indiana, have invented certain new and useful Improvements in a Combined Saw Jointer, Set, Swage, and Gage; and I do declare the following to be a full, clear, and exact description of the invention, reference being had to the accompanying drawings, and to the letters and figures of reference marked thereon, which form a part of this specification.

This invention relates to a hand tool or implement that is designed to be used in performance of various operations for the purpose of keeping saws in proper working order which may be required as a result of their use, the invention having reference particularly to a combination tool having facilities for holding a file in different positions for truing the saw teeth and having also a saw set or device for setting the saw teeth, and a double gage to be used for determining the adjustments of the setting apparatus and combining also a swage for the rake teeth of the saw.

The object of the invention is to provide an improved combination tool of the above-mentioned character that will enable a saw filer to carry on his work expeditiously and without requiring the handling of various separate tools or implements, a further object being to provide in one simple and cheaply constructed tool certain features which heretofore have been constructed as separate tools or implements that necessarily involves relatively greater expense for material and labor, a still further object being to provide a compact, strong and economical saw filer's tool or implement.

With the above-mentioned and minor objects in view the invention consists in an improved combination tool provided with means for holding a file to be used as a saw-jointer, the implement including a saw set of novel form and arrangement, a saw swage, and adjustable gage for the saw set, and a double standard test gage for regulating the amount of the set of the saw teeth; and the invention consists further in the novel parts and combinations and arrangements of parts as hereinafter particularly described and pointed out in the appended claims.

Referring to the drawings Figure 1 is a plan view of the combination tool showing the side thereof on which the file is held thereby; Fig. 2, a plan view showing the opposite side of the tool; Fig. 3, a transverse sectional view on the line A in Fig. 2; Fig. 4, a transverse sectional view on the line B in Fig. 2; Fig. 5, a perspective view of a double clamping jaw for holding the file in different positions; and, Fig. 6, a perspective view of the adjustable stop gage of the saw set.

Similar reference characters in the different figures of the drawings designate like elements or features of construction.

Combination tools have heretofore been made for holding jointing files in different positions, but in the construction thereof relatively expensive operations were required in order to produce the devices for clamping the file, and in the present invention such difficulties have been obviated in an improved form of construction, and other features have been advantageously arranged as parts of the complete implement which comprises a body part $a$ which may be composed of any suitable metal such as cast iron, the general shape of which is somewhat like a flat plate suitably apertured to avoid excessive weight. One side of the body part in its incomplete form presents a flat surface, and portions of the opposite side have two file seats $b$ and $c$ on which a file may rest flatwise, there being shoulders $b'$ and $c'$ on the seats to be engaged by one edge of the file. The same side of the body part has suitable flanges $d$ and $d'$ along its edge joined to the file seats, and also ribs $e$ and $e'$ extending along the middle portion of the body part opposite to the flanges and also joined to the file seats. The body part is provided with a pair of abutments $f$ and $f'$ near the opposite edge thereof, and they project from the same side of the plate on which the ribs $e$ and $e'$ are formed to assist in holding a file which may be placed flatwise against the abutments. A threaded nut $g$ is fixed to the body part $a$ and projects from the side thereof between the ribs $e$ and $e'$. A double clamping jaw $h$ is mounted on the side of the body part $a$ and is suitably apertured to clear the nut $g$ and provided at one end thereof with a head $h'$, the opposite end being adapted to engage and hold a file against the abutments $f$ and $f'$, the head $h'$ being engaged by the head of a screw $i$ and also adapted to engage one edge of a file to force the opposite edge thereof against the shoulders $b'$ and $c'$ so that the clamping jaw may hold a file either edgewise on the body part as shown in Fig. 1 or flatwise as indicated by broken lines also in Fig. 1.

The portion of the body part $a$ on which the abutments $f$ and $f'$ are arranged also has two gages $j$ and $k$ that project beyond the edge of the body part at opposite end portions thereof and also a gage projection $l$ which is arranged between the other two projections but somewhat nearer to one than the other one, and the projection $l$ extends farther beyond the edge of the body part than the other two projections, so that if two of the projections as $j$ and $l$ be placed on a straight line or plane $m\ n$, the projection $k$ will be at some distance from the line, and if the projections $l$ and $k$ be placed on the line, the projection $j$ will be nearer to the line as in Fig. 2, than the projection $k$ would be to the line as indicated in Fig. 1. Said line may represent a side of a saw, and if it be desired that the saw teeth are to have a considerable degree of set this may correspond to the distance between the end of the projection $k$ and the side of the saw, or correspond to the line $m\ n$, and the test tooth is to be set over until it agrees with this gage, while if less set is desired it will be set over only enough to agree with the gage $j$ when the gage projections $l$ and $k$ are placed against the side of the saw, the two standards being produced by arranging the gage $l$ so as to be closer to the projection $j$ than it is to the projection $k$ and sufficiently long so that when on a plane either one of the projections $j$ or $k$ only can touch the same plane at one time.

A bar $o$ which should be made of relatively hard metal is secured by rivets $p$ and $p'$ to the flat side of the body part $a$ and is somewhat shorter than the body part, one end of the bar having a head $q$ in which is a slot $r$ to receive a saw tooth, the inner end of the slot having a recess $s$ for clearance purposes. The slot is adjacent to the side of the body part $a$ which may serve as a guide against the tooth when using the setting tool. The opposite end of the bar $o$ has a point $t$ to be entered between two rake teeth and has two opposite concavely-curved sides $u$ and $u'$, designed to cause the teeth to bend slightly away each from the other, the adjacent side of the body part $a$ serving as a guide against the sides of the teeth while using the swaging tool. A stop gage $v$ is arranged also on the flat side of the body part $a$ adjacent to the bar $o$ which serves as a guide while adjusting the gage, the latter having a slot $w$ therein through which extends a screw $x$ that is threaded into the body part $a$, said gage having a contact end $v'$ adapted to engage the side of the saw when a tooth extends into the slot $r$ and the tool is operated to set over the tooth. The file $y$ indicates one of the well known ways in which the file may be used, and the file $z$ shown by broken lines indicates the different positions for holding the file, all being well understood by the users of saw jointers.

In practical use it will be readily understood that the saw to be operated on will be securely supported and the swage will be used in vertical position so that the head $q$ may be struck by a hammer while the point $t$ is inserted between two of the rake teeth to be swaged thereby, and this rapid operation will improve the forms of the teeth and avoid some of the work usually necessary in filing the rake teeth. When setting the teeth the head $q$ will be placed on a tooth which will extend into the slot $r$, and then the tooth should be set over slightly and tested by either the gage $j$ or the gage $k$, as may be desired, and when it tests to the desired gage then the stop gage $v$ should be adjusted so as to produce the required amount of set according to the standard test gage. In case that it be desired to deviate from the standard gages, the stop gage $v$ may be further adjusted as may be required to obtain the amount of set that may be preferred.

Having thus described the invention, what is claimed as new is—

1. In a saw set and swage, the combination with a bar having a slot in a side of one end thereof and a tapering point on the opposite end thereof, of a body part bearing against said bar and extending across one side of said slot and also at one side and beyond said point as guides to engage the saw teeth.

2. In a saw set, the combination with a metal plate that has a long portion and a relatively short portion, of a bar of relatively hard metal that is secured rigidly to a side of the long portion of said plate, one end of said bar having a head that extends beyond an end of said long portion and has a slot in a side thereof extending to the long portion of said plate, one side of said bar being straight and serving as a guide part, a stop gage on the shorter portion of said plate and bearing against the guide part of said bar, said gage having a slot therein and also having a contact end extending beyond the shorter portion of said plate, and a binding screw extending through said slot and threaded into said plate.

In testimony whereof, I affix my signature in presence of two witnesses.

HEZEKIAH L. TRUEBLOOD.

Witnesses:
WM. H. PAYNE,
E. T. SILVIUS.